United States Patent
Walker et al.

(10) Patent No.: US 6,601,036 B1
(45) Date of Patent: Jul. 29, 2003

(54) SYSTEM AND METHOD FOR DYNAMIC ASSEMBLY OF PACKAGES IN RETAIL ENVIRONMENTS

(75) Inventors: Jay S. Walker, Ridgefield; Daniel E. Tedesco, New Canaan; Andrew S. Van Luchene, Norwalk, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/571,210

(22) Filed: May 16, 2000

Related U.S. Application Data

(63) Continuation of application No. 09/085,424, filed on May 27, 1998, which is a continuation-in-part of application No. 09/012,163, filed on Jan. 22, 1998, which is a continuation-in-part of application No. 08/947,798, filed on Oct. 9, 1997, which is a continuation-in-part of application No. 08/920,116, filed on Aug. 26, 1997, which is a continuation-in-part of application No. 08/822,709, filed on Mar. 21, 1997.

(51) Int. Cl.[7] .............................................. G06F 17/60
(52) U.S. Cl. .............................. 705/10; 705/14; 705/16
(58) Field of Search .............................. 705/26, 27, 14, 705/10, 16, 22, 28; 235/378, 385, 380

(56) References Cited

U.S. PATENT DOCUMENTS

| | | | |
|---|---|---|---|
| 3,573,747 A | 4/1971 | Adams et al. ........... | 340/172.5 |
| 4,108,361 A | 8/1978 | Krause ....................... | 235/375 |
| 4,323,770 A | 4/1982 | Dieulot et al. .............. | 235/375 |
| 4,494,197 A | 1/1985 | Troy et al. .................. | 364/412 |
| 4,500,880 A | 2/1985 | Gomersall et al. ..... | 340/825.35 |
| 4,669,730 A | 6/1987 | Small ..................... | 273/138 A |
| 4,677,553 A | 6/1987 | Roberts et al. ............. | 364/412 |
| 4,689,742 A | 8/1987 | Troy et al. .................. | 364/412 |

(List continued on next page.)

FOREIGN PATENT DOCUMENTS

| | | | |
|---|---|---|---|
| EP | 0085546 A2 | * | 1/1983 |
| EP | 512413 A2 | | 11/1992 |
| JP | 5242363 A | | 9/1993 |
| WO | WO-97/28510 A1 | * | 8/1997 |
| WO | WO 97/35441 A2 | | 9/1997 |
| WO | WO 97/46961 A1 | | 12/1997 |
| WO | WO 97/50064 A1 | | 12/1997 |

OTHER PUBLICATIONS

Mulhern et al, "Implicit Price Bundling of Retail Products: A Multiproduct Approach to Maximizing Store Profitability", Journal of Marketing, vol. 55, Issue 4, pp. 1–22, Oct. 1991.*

(List continued on next page.)

*Primary Examiner*—James P. Trammell
*Assistant Examiner*—John W. Hayes
(74) *Attorney, Agent, or Firm*—Dean P. Alderucci

(57) ABSTRACT

A system and method for managing the sale of a group of products at a single price based on sales performance data of the products is presented. The method and apparatus include offering a plurality of products by identifying products that are complementary, verifying acceptable sales performance for the complementary products, identifying a package including the complementary products having acceptable sales performance, determining a package price for the products included in the package, and offering the products included in the package at the package price. The status of the package is set to invalid when a time interval in which the package is available has expired. The method and apparatus further include package offer redemption by identifying a package including the products identified, determining a package price for the products included in the package, processing a sale of the products included in the package, adjusting sales performance data based on the sale of the products, and setting a status of the package to invalid when the sales performance data for the products included in the package fail to meet limits.

26 Claims, 14 Drawing Sheets

PACKAGE ASSEMBLY RULES TABLE 500

| PACKAGE OFFER RULE ID 502 | NUMBER OF COMPONENT PRODUCTS IN PACKAGE OFFER 504 | PACKAGE OFFER PRICE FACTOR 506 | COMPLEMENTARY PRODUCT FAMILIES 508 | COMPLEMENTARY DEMAND RATE RULES 510 | PACKAGE OFFER REDEMPTION RULES 512 |
|---|---|---|---|---|---|
| R1 | 2 | -10%(PRODUCT ID 1 + PRODUCT ID 2) | PRODFAM_A, PRODFAM_B; PRODFAM_A, PRODFAM_C; PRODFAM_B, PRODFAM_C | >15/DAY AND <5/DAY | WHILE SUPPLIES LAST |
| R2 | 3 | (PRICE PRODUCT ID 1 + PRICE PRODUCT ID 2 + PRICE PRODUCT ID 3) - $1.50 | PRODFAM_A, PRODFAM_B, PRODFAM_D; PRODFAM_A, PRODFAM_D, PRODFAM_E; PRODFAM_A, PRODFAM_B, PRODFAM_E; PRODFAM_B, PRODFAM_D, PRODFAM_E | >25/DAY AND <5/DAY | -LIMIT ONE PER FREQUENT SHOPPER CUSTOMER -OFFER GOOD UNTIL 5/1/98 |

U.S. PATENT DOCUMENTS

| | | | |
|---|---|---|---|
| 4,723,212 A | 2/1988 | Mindrum et al. | 364/401 |
| 4,760,247 A | 7/1988 | Keane et al. | 235/454 |
| 4,815,741 A | 3/1989 | Small | 273/138 A |
| 4,825,045 A | 4/1989 | Humble | 235/383 |
| 4,839,507 A | 6/1989 | May | 235/381 |
| 4,854,590 A | 8/1989 | Jolliff et al. | 273/138 A |
| 4,859,838 A | 8/1989 | Okiharu | 235/383 |
| 4,882,473 A | 11/1989 | Bergeron et al. | 235/380 |
| 4,908,761 A | 3/1990 | Tai | 364/401 |
| 4,910,672 A | 3/1990 | Off et al. | 364/405 |
| 4,922,522 A | 5/1990 | Scanlon | 379/95 |
| 4,937,853 A | 6/1990 | Brule et al. | 379/96 |
| 4,973,952 A | 11/1990 | Malec et al. | 340/825.35 |
| 4,982,337 A | 1/1991 | Burr et al. | 364/479 |
| 4,993,714 A | 2/1991 | Golightly | 273/138 A |
| 5,056,019 A | 10/1991 | Schultz et al. | 364/405 |
| 5,119,295 A | 6/1992 | Kapur | 364/412 |
| 5,128,862 A | 7/1992 | Mueller | 364/405 |
| 5,132,914 A | 7/1992 | Cahlander et al. | 364/478 |
| 5,172,328 A | 12/1992 | Cahlander et al. | 364/478 |
| 5,173,851 A | 12/1992 | Off et al. | 364/401 |
| 5,177,342 A | 1/1993 | Adams | 235/379 |
| 5,192,854 A | 3/1993 | Counts | 235/375 |
| 5,201,010 A | 4/1993 | Deaton et al. | 382/7 |
| 5,216,595 A | 6/1993 | Protheroe | 364/412 |
| 5,223,698 A | 6/1993 | Kapur | 235/375 |
| 5,231,569 A | 7/1993 | Myatt et al. | 364/405 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,256,863 A | 10/1993 | Ferguson et al. | 235/383 |
| 5,262,941 A | 11/1993 | Saladin et al. | 364/408 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,031 A | 3/1994 | Gutterman et al. | 364/408 |
| 5,302,811 A | 4/1994 | Fukatsu | 235/381 |
| 5,309,355 A | 5/1994 | Lockwood | 364/401 |
| 5,353,218 A | 10/1994 | De Lapa et al. | 364/401 |
| 5,353,219 A | 10/1994 | Mueller et al. | 364/405 |
| 5,380,991 A | 1/1995 | Valencia et al. | 235/383 |
| RE34,915 E | 4/1995 | Nichtberger et al. | 364/401 |
| 5,420,606 A | 5/1995 | Begum et al. | 345/156 |
| 5,434,394 A * | 7/1995 | Roach et al. | 235/375 |
| 5,459,306 A | 10/1995 | Stein et al. | 235/383 |
| 5,481,094 A * | 1/1996 | Suda | 705/14 |
| 5,504,475 A | 4/1996 | Houdou et al. | 340/825.35 |
| 5,510,979 A | 4/1996 | Moderi et al. | 364/405 |
| 5,572,653 A | 11/1996 | DeTemple et al. | 395/501 |
| 5,581,064 A | 12/1996 | Riley et al. | 235/383 |
| 5,592,375 A | 1/1997 | Salmon et al. | 395/207 |
| 5,592,376 A | 1/1997 | Hodroff | 395/214 |
| 5,602,377 A | 2/1997 | Beller et al. | 235/462 |
| 5,611,052 A | 3/1997 | Dykstra et al. | 395/238 |
| 5,612,868 A | 3/1997 | Off et al. | 364/214 |
| 5,615,269 A | 3/1997 | Micali | 380/49 |
| 5,620,079 A | 4/1997 | Molbak | 194/217 |
| 5,621,201 A | 4/1997 | Langhans et al. | 235/380 |
| 5,621,640 A | 4/1997 | Burke | 395/214 |
| 5,632,010 A | 5/1997 | Briechle et al. | 345/1 |
| 5,664,115 A | 9/1997 | Fraser | 705/37 |
| 5,665,953 A | 9/1997 | Mazzamuto et al. | 235/383 |
| 5,724,886 A | 3/1998 | Ewald et al. | 99/374 |
| 5,774,868 A * | 6/1998 | Cragun et al. | 705/10 |
| 5,878,401 A * | 3/1999 | Joseph | 705/22 |
| 5,933,813 A * | 8/1999 | Teicher et al. | 705/26 |
| 6,026,370 A * | 2/2000 | Jermyn | 705/14 |
| 6,049,777 A * | 4/2000 | Sheena et al. | 705/10 |
| 6,138,105 A * | 10/2000 | Walker et al. | 705/10 |

OTHER PUBLICATIONS

Anonymous, "The Dynamics of Micromarketing: Pinpointing Your Customers", Abstract, Progressive Grocer, vol. 73, Oct. 1994.*

Author Unknown, "Cape Town", Reuters Ltd Reuters, Nov. 8, 1979.

Author Unknown, "Save the Mark", The Financial Times Limited, Financial Times (London), Feb. 1, 1983.

Cook, Louise, "ConsumerWatch: Clip, Snip, Save", The Associated Press, Mar. 12, 1984, Business News Section.

Greene, Jan, "Farm Bills Please Assns; National Grocers Association", Capital Cities Media, Inc., Dec. 23, 1985 vol. 35 at p. 6, ISSN: 0039–5803.

Anonymous, "POS Spectrum: A Lottery Looks to POS for Growth", UMI, Inc., Banking Information Source, POS News, Jan. 1989, vol. 5, No. 7 at p. 8, ISSN: 0896–6230.

Kuttner, Robert, "Computers May Turn the World into One Big Commodities Pit", Business Week, Sep. 11, 1989, Economic Viewpoint Section; No. 3123 at p. 17.

Schrage, Michael, "An Experiment in Economic Theory; Labs Testing Real Markets", The Record, Nov. 26, 1989; Business Section at p. BO1.

"Let's Play the Cash Register Receipts Lottery", The New York Times, The New York Times Dec. 25, 1990, Section 1, col. 4 at p. 30.

Del Rosso, Laura, "Marketel Says It Plans to Launch Air Fare 'Auction' in June", Reed Travel Group, Travel Weekly, Apr. 29, 1991, vol. 50 No. 34 at p. 1, ISSN: 0041–2082.

Author Unknown, Philips Offers Customers Financing Through Citicorp; Philips Medical Systems North America, Citicorp North America Inc., Business Word Inc., Health Industry Today, vol. 54, No. 6 at p. 4, ISSN: 0745–4678.

Pelline, Jeff, "Travelers Bidding on Airline Tickets SF Firm Offers Chance for Cut–Rate Fares", The San Francisco Chronicle, Aug. 19, 1991 at p. A4.

Del Rosso, Laura, "Ticket–bidding Firm Closes its Doors; Marketel International", Travel Weekly, Mar. 12,1992, vol. 51, No. 21 at p. 1, ISSN: 0041–2082.

Author Unknown, "Coupons Get Serious; Supermarkets Use Barcodes to Prevent Misredemptions", Information Access Company, Chain Store Age Executive with Shopping Center Age, Oct., 1992, vol. 68, No. 10 at p. 68, ISSN: 0192–1199.

Author Unknown, "Winn–Dixie/The Salvation Army Report Contributions for War Against Hunger", PR Newswire, Jun. 10, 1993, Financial News Section.

Jones, Jeanne, "Data Readers Streamline Management; Scanner Technology Aids Retailers As Well As Plants, Wholesalers", The Houston Post, Jun. 26, 1994, Business Section at p. 01.

Fiorini, Phillip, "'No Place for Penny?'/ Smallest Coin Doesn't Make Cents to Some", USA Today, Jul. 29, 1994, News Section at p. 1A.

Smith, Alison, "Survey of UK Consumer Credit and Asset Finance", Financial Times, Nov. 3, 1994 at p. VI.

Andreoli, Tom, Borden, Jeff, Healy, Beth, Strahler, Steven R. and Veverka, Mark, "Cash Machines Offer a Whole Lotto Money for Withdrawal; An Unfortunate Juxtaposition; Block that Metaphor!; Somethi ng Street Talk; Fishy in Springfield; State Street Sears?; Champion as Underdog; A 'Whole Language' Graduate", Crain's Chicago Business, Jun. 19, 1995, News Section at p. 8.

Author Unknown, "Spain: BBV Launches New Card", Cards International, Jun. 22, 1995 at p. 5.

Garry, Michael, "Oh Baby"; Progressive Grocer, Jul. 1995 at pp. 39 and 42.

Knippenberg, Jim, "Psst! Will Local Radio Empires Strike Back?", The Cincinnati Enquirer, Jul. 23, 1995, Tempo Section at p. P01.

"Cyber BID", Copyright 1996 and 1995, Net Fun Ltd.

Hadley, Kimberly, "Pastors Praying Anti-arson Effort Will Burn Bias", The Nashville Banner, Jul. 26, 1996, Final Edition News Section at p. A13.

Gapper, John, "NatWest Reports Rise in Bad Debts", Financial Times, London Edidtion 3, Jul. 31, 1996, UK News Section at p. 09.

Author Unknown, "Lynx Technology: Lynx to Provide Business Leasing Programme Through Schroeder Leasing", M2 Presswire, Aug. 9, 1996.

Taylor, Paul, "Towards A Dream Market", Financial Times (London) Sep. 4, 1996, Survey Section at p. 03.

Bonnici, Joesph, Campbell, David P., Fredenberger, William B., Hunnicutt, Kathryn H., "Consumer Issues in Coupon Usage: An Exploratory Analysis", Journal of Applied Business Research, Winter 1996/1997, vol. 13, No. 1 at p. 31–40, ISSN: 0892–7626.

Singletary, Michelle, "Electronic World, Unchecked Problem? U.S. Move to Paperless Payments Raises Worries About those Who Don't Use Banks", The Washington Post, Mar. 4, 1997, Financial Section at p. C01.

Kelsey, John, Schneier, Bruce, "Conditional Purchase Orders", Fourth ACM Conference on Computer Communication Security, Apr. 1997, ACM Press at p. 117–124.

"Avco Financial Services", (http://www.homefurnish.com/NHFA/avco.htm), download date: May 23, 1997.

Catalina Marketing Corporation, "Products and Services", (http://catalinamktg.com/prodmsg.htm), download date: May 29, 1997.

Riordan, Theresa, "Patents; A Novel Approach to Making a Better Spermicide Harks Back to Some Old–fashioned Methods.", The New York Times, Jun. 9, 1997, Section D at p. 2. (See page two (2) for the article.)

"The Key To Your Identity: Falling Costs Will Allow Fingerprint Verification to Be Widely Used, Reports Geoff Nairn", Financial Times (London) USA Edition 1, Jul. 15, 1997, Technology Section at p. 12.

"The United Computer Exchange, How It All Works", (http://www.uce.comhowitworks.htm), download date: Jul. 23, 1997.

"Classifieds2000: The Internet Classifieds", (http://www.classifieds2000.com/cgi–cls/Display.exe?C2K+aboutus), download date: Aug. 6, 1997.

"tradingfloor.com: General Trading Information and Terms Provided by tradingfloor.com", (http://www.tradingfloor.com/info.htm), download date: Aug. 14, 1997.

"NASDAQ", What is NASDAQ? Information Sheet. (http://home.axford/com/corfin/corf11.htm), download date: Aug. 15, 1997.

Prochaska–Cue, Kathy, "Acquiring Credit", (http://ianrwww.unl.edu/IANR/PUBS/NEBFACTS/NF91–2.htm), download date: Sep. 3, 1997.

"Welcome to ONSALE: Auction Supersite", (http://www.onsale.com.category/category/inv/00124972.htm), download date: Sep. 8, 1997.

"About IAO", Interactive Auction Online, (http://www.iaoauction.com/about.htm), download date: Sep. 8, 1997.

Kirk, Jim, "Digital Promotions Make Quick Point; McDonald's Testing New Technology on its Menus", Chicago Tribune, North Sports Final Edition Dec. 26, 1997, Business Section at p. 1, Zone: N.

"It's in the Bag.", Introducing the Universal Holding Cabinet from Welbilt.The Frymaster C orporation 1998.

"NCR 7453 PC–Based Point–of–Sale Solution", 1998 NCR Corporation.

"Progressive Introduces Kitchen Display System (KDS) for Restaurants", PR Newswire, Financial News, Jan. 23, 1998.

Blair, Adam, "JICC Coupon Guide Recommends Upgrades at Front End", Supermarket News, Feb. 9, 1998 at p. 23, ISSN: 0039–5803.

Livingston, Kimball, "In–Store Systems, VideOcart Redux", RT Magazine Mar. 1998 at p. 29–30.

Advanced Mechanics, "Advanced Mechanics Internet Specials", (http://www.metroplexweb.com/advcpn2.htm), download date: Mar. 12, 1998.

U.P.C. Coupon Code Guidelines Manual, Uniform Code Council, Inc., (http://www.uc–council.org/d31–3.htm), download date: Mar. 12, 1998.

Hamstra, Mark, "'Made–for–You' Maneuvers Signal Competitive Shift in QSR Category", Nation's Restaurant News, Apr. 13, 1998.

H & K Dallas Inc., "Universal Holding Cabinet Rollout Program", Winter 1998.

Wakefern Food Corporation, Corporate Merchandising, "5 Weeks of Coupon Values for A Valuable Customer!", Copyright Wakefern Food Corporation, 1998.

"Positive Input", The Value of Service, The McDonald's POS–3 System Newsletter from Olivetti Solutions/OLSY. Spring/Summer Edition 1998.

Promotion Times, an SCA Quarterly Newsletter, "New Wave" Marketing, Apr. 1998.

Olivetti, "For the Crew & the Customer: The Best Drive–Thru & Grill Service", Winter 1998.

Siren Technologies, Inc., "Introducing the Digital Menu-Board(TM)", (www.sirentech.com). Undated.

Rehayem, Gilbert, "Opinion: X–Press Billing", La Fleur's Lottery World. Undated.

Salinger, Michael A., "A Graphical Analysis of Bundling", Journal of Business, vol. 68, No. 1, pp. 85–98, 1995.*

Matutes et al, "Compatibility and Bundling of Complementary Goods in a Duopoly", The Journal of Industrial Economics, vol. XL, No. 1, pp. 37–54, Mar. 1992.*

* cited by examiner

INVENTORY TABLE 400

| PRODUCT ID 402 | PRODUCT UNIT PRICE 404 | AVAILABLE INVENTORY 406 | DEMAND RATE 408 |
|---|---|---|---|
| PRODUCTFAM_A_UNIQUEPRODID_7 | $1.00 | 15 | 20/DAY |
| PRODUCTFAM_A_UNIQUEPRODID_8 | $5.00 | 19 | 18/DAY |
| PRODUCTFAM_B_UNIQUEPRODID_3 | $3.00 | 7 | 6/DAY |
| PRODUCTFAM_B_UNIQUEPRODID_9 | $2.00 | 9 | 4/DAY |
| PRODUCTFAM_C_UNIQUEPRODID_6 | $3.50 | 11 | 9/DAY |
| PRODUCTFAM_D_UNIQUEPRODID_8 | $6.50 | 12 | 1/DAY |
| PRODUCTFAM_E_UNIQUEPRODID_2 | $1.50 | 0 | 26/DAY |

FIG. 4

PACKAGE ASSEMBLY RULES TABLE 500

| PACKAGE OFFER RULE ID 502 | NUMBER OF COMPONENT PRODUCTS IN PACKAGE OFFER 504 | PACKAGE OFFER PRICE FACTOR 506 | COMPLEMENTARY PRODUCT FAMILIES 508 | COMPLEMENTARY DEMAND RATE RULES 510 | PACKAGE OFFER REDEMPTION RULES 512 |
|---|---|---|---|---|---|
| R1 | 2 | -10%(PRODUCT ID 1 + PRODUCT ID 2) | PRODFAM_A, PRODFAM_B; PRODFAM_A, PRODFAM_C; PRODFAM_B, PRODFAM_C | >15/DAY AND <5/DAY | WHILE SUPPLIES LAST |
| R2 | 3 | (PRICE PRODUCT ID 1 + PRICE PRODUCT ID 2 + PRICE PRODUCT ID 3) - $1.50 | PRODFAM_A, PRODFAM_B, PRODFAM_D; PRODFAM_A, PRODFAM_D, PRODFAM_E; PRODFAM_A, PRODFAM_B, PRODFAM_E; PRODFAM_B, PRODFAM_D, PRODFAM_E | >25/DAY AND <5/DAY | -LIMIT ONE PER FREQUENT SHOPPER CUSTOMER -OFFER GOOD UNTIL 5/1/98 |

FIG. 5

PACKAGE OFFER TABLE 600

| PACKAGE OFFER ID 602 | PACKAGE OFFER RULE ID 604 | PACKAGE OFFER PRICE 606 | PACKAGE OFFER REDEMPTION RULES 608 | COMPONENT PRODUCTS 610 | PACKAGE OFFER STATUS 612 |
|---|---|---|---|---|---|
| P1 | R1 | $2.70 | WHILE SUPPLIES LAST | PRODFAM_A_UNIQUEPRODID_7 PRODFAM_B_UNIQUEPRODID_9 | VALID |
| P2 | R2 | $8.50 | LIMIT ONE PER FREQUENT SHOPPER CUSTOMER OFFER GOOD UNTIL 5/1/98 | PRODFAM_E_UNIQUEPRODID_2 PRODFAM_B_UNIQUEPRODID_9 PRODFAM_D_UNIQUEPRODID_8 | INVALID |

FIG. 6

SYSTEM AND METHOD FOR DYNAMIC ASSEMBLY OF PACKAGES IN RETAIL ENVIRONMENTS

CROSS-REFERENCE TO RELATED CORRESPONDING APPLICATIONS

The present application is a continuation of commonly owned, U.S. patent application Ser. No. 09/085,424, entitled, "System And Method For Dynamic Assembly Of Packagaes In Retail Environments", filed May 27, 1998, which is issued as U.S. Pat. No. 6,138,105 on Oct. 24, 2000; which is a continuation-in-part of commonly owned, U.S. patent application Ser. No. 09/012,163 entitled "Method and Apparatus for Automatically Vending a Group of Products" filed Jan. 22, 1998, and which issued as U.S. Pat. No. 6,397,193 B1 on May 28, 2002; which is a continuation-in-part of commonly owned, co-pending U.S. patent application Ser. No. 08/947,798 entitled "Method and Apparatus for Dynamically Managing Vending Machine Inventory Prices" filed Oct. 9, 1997, and a continuation-in-part of commonly owned, U.S. patent application Ser. No. 08/920,116 entitled "Method and System for Processing Supplementary Product Sales at a Point-of-Sale Terminal" filed Aug. 26, 1997, and which issued as U.S. Pat. No. 6,119,099 on Sep. 12, 2000; which is a continuation-in-part of U.S. patent application Ser. No. 08/822,709 entitled "System and Method for Performing Lottery Ticket Transactions Using Point-of-Sale Terminals" filed Mar. 21, 1997, and which issued as U.S. Pat. No. 6,267,670 B1 on Jul. 31, 2001, the entirety of each being incorporated herein by reference.

BACKGROUND OF THE INVENTION

1. Field of the Invention

The present invention relates generally to methods and apparatuses for processing sales. More particularly, the present invention relates to a method and apparatus for processing sales of multiple products at a single price based on sales performance data of the products.

2. Description of the Related Art

The retail industry often offers a group of products together at a single price. By way of example, fast food restaurants have been known to offer meals which include a hamburger, French fries and a soda at a single price which is less than the sum of the prices of the individual products. Alternatively, a product may be added, e.g., a complementary apple pie is provided with the purchase of a hamburger, French fries and a soda at their regular price. These meals are typically ordered from "order-by-number" or "package deal" menus, thereby providing the customer a convenient way to order multiple products. Often these products are so related that they are commonly purchased during a single transaction, making them ideal candidates for a packaged type offering. Moreover, the customer is encouraged (in effect rewarded) to purchase more than the customer may have initially intended. For example, a customer that may have intended only to purchase the hamburger and soda may respond to the promotion by purchasing the packaged meal that also includes French fries for a slightly higher price.

Other retailers commonly offer a plurality of products, which may be the same or different but are typically closely related, at a single price. For example, a clothing store may offer any two sweaters at a single price which is lower than the sum of the prices of the two sweaters individually. Alternatively, an additional product such as a fourth pair of socks may be offered for free to those who purchase three pairs of socks. These methods are typically employed in a "clearance" sale, e.g., at the end of a season. Clearance sales are usually only implemented when demand levels fall below a certain threshold at which the retailer decides that a sale is necessary to sell the surplus inventory. Since such decisions are not continuously decided in proportion to demand patterns, retailers miss an opportunity to optimize decisions as to such sales. The consumer's perceived value of the package allows the retailer to sell products that otherwise may not be sold. However, the purported value of a package offer may not be perceived accurately by consumers, since package pricing allows the retailer to disguise the price of the individual products in the package which may be discounted or inflated. Regardless, a customer is encouraged to purchase more than they may have initially intended.

Nevertheless, retailers are still faced with the problem of selling inventory that has become distressed. Retailers typically offer their distressed inventory at cost or even at a loss to make room for more profitable merchandise or to avoid a substantial loss in their investment. Inventory becomes distressed when the supply exceeds demand, such as when a product becomes unpopular at market. The risk of inventory becoming distressed increases with products that are perishable or that will expire. The closer products get to perishing or expiring, the less likely it becomes that the retailer will sell the product for a profit providing demand at least remains constant or diminishes. If the product expires before it is sold, the retailer will lose all revenue opportunities associated with that product.

Consequently, retailers frequently dispose of expired products they were unable to sell. By way of example, fast food restaurants generally throw out any prepared food that has not been sold by the time the restaurant closes. Also, unsold magazines and newspapers are disposed of when they expire.

In recent years, an economic theory known as "revenue management" has been proposed to solve inventory related problems. The theory states that markets are most efficient when prices are dynamically adjusted in proportion to supply and demand. The practice of revenue management has proven to be highly successful in the airline industry. More specifically, airlines use revenue management principles to optimize their profits on perishable inventory by selling seats at prices that vary in accordance with supply and demand. Furthermore, the grandparent application to the present invention, U. S. patent application Ser. No. 08/947, 798 entitled "Method and Apparatus for Dynamically Managing Vending Machine Inventory Prices," filed Oct. 10, 1997, employs such revenue management concepts in vending machines. However, a need clearly exists to solve inventory problems in retail environments.

SUMMARY OF THE INVENTION

An object of the present invention is to enable a retailer to offer groups of goods at discounted prices in accordance with dynamic measurements of supply and demand.

An advantage of the present invention is that by pairing low demand products with high demand products, a retailer can utilize the popularity of one product to sell another less popular product. Another advantage of the present invention is that by requiring consumers to purchase a package in order to be eligible for a discount, a retailer can substantially discount products without exposing its price floor.

According to the present invention, a method and apparatus are disclosed for offering a plurality of products. A package offering system identifies the product identifiers of products that are complementary, and verifies acceptable sales performance of the complementary products. The system identifies a package which includes the product identifiers of the complementary products having acceptable sales performance, and determines a package price for those products. A status of the package is set to invalid upon expiration of a time interval in which the package is available.

In accordance with the present invention, package offer redemption includes receiving a plurality of product identifiers that are indicative of a plurality of products. A package including the received product identifiers is identified and a package price for those products is determined. Then, a sale of the products is processed, and sales performance data are adjusted based on the sale of the products. The status of the package is set to invalid when the sales performance data for the products fail to meet established limits.

BRIEF DESCRIPTION OF THE DRAWINGS

FIG. 4 is a tabular representation of the INVENTORY TABLE DATABASE of FIG. 2;

FIG. 5 is a tabular representation of the PACKAGE ASSEMBLY RULES TABLE DATABASE of FIG. 2;

FIG. 6 is a tabular representation of the PACKAGE OFFER TABLE DATABASE of FIG. 2;

DESCRIPTION OF THE PREFERRED EMBODIMENT

Figure 1:
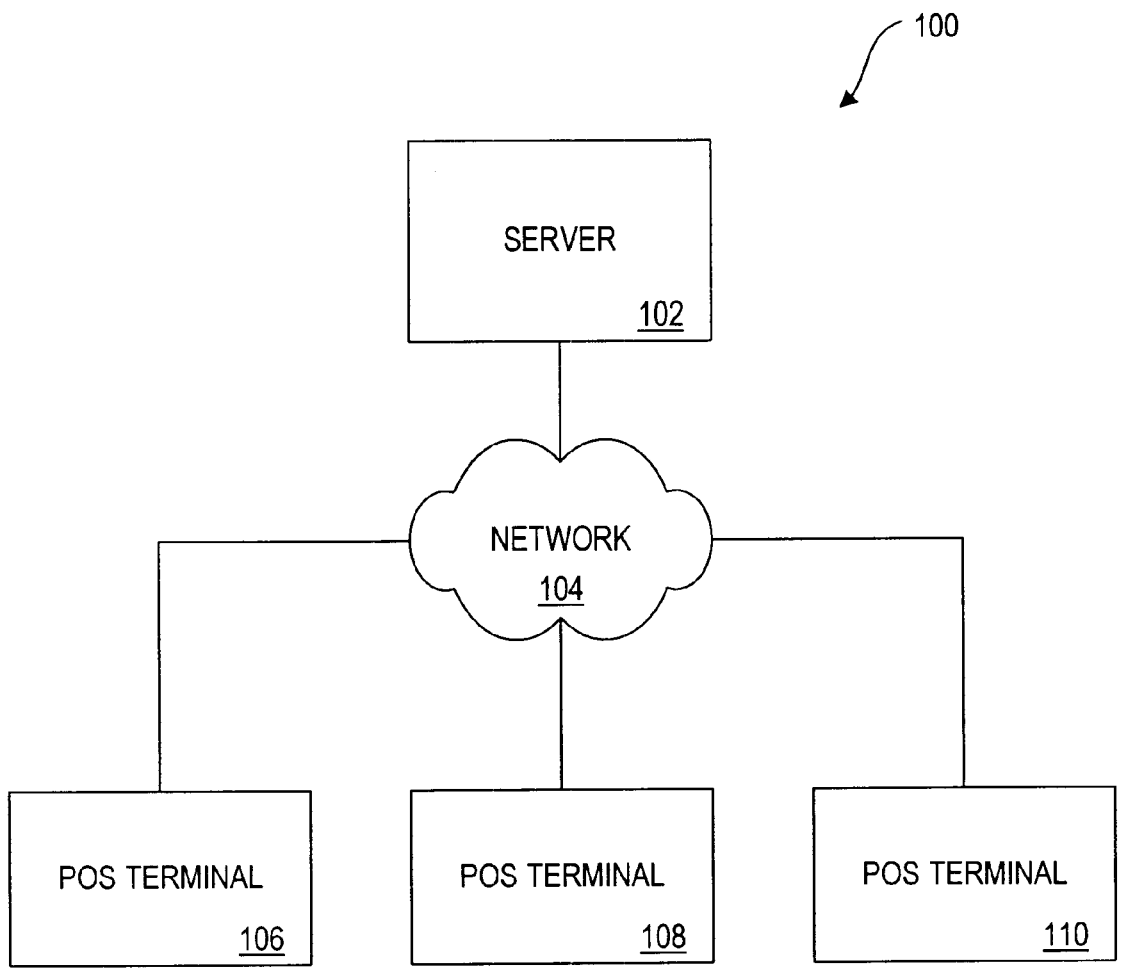
FIG. 1 is a block diagram of a package offering system in accordance with the present invention.

The following terms are used throughout the remainder of this section. For purposes of lo construction, such terms shall have the following meanings:

The terms "item", "product", "goods", and "services", unless otherwise specified, are intended to refer to any item and/or service sold or offered by a retailer. Accordingly, for purposes of construction, the terms "item", "product", "goods" or "services" shall be treated as synonyms.

The terms "store", "retailer", and "retail establishment", unless otherwise specified, are intended to refer to any retail merchandising establishment that caters to the public and that allows customers to select products and services. Retail establishments may be a retail store such as a warehouse, a supermarket or grocery store, a department store, a restaurant or any other retail or merchandising establishment. Accordingly, for purposes of construction, the terms "store", "retailer", and "retail establishment" shall be treated as synonyms.

The terms "customer", "consumer" and "shopper", unless otherwise specified, are intended to refer to any person, group of people, or other entity that visits or otherwise patronizes a retailer and who purchases products and/or services from the retailer.

The term "purchase", unless otherwise specified, is intended to refer to one or more items that a customer buys from a retail establishment.

The term "complementary product", unless otherwise specified, is intended to refer to a product that may be advantageously paired by price or product type with another such as by price or product type.

The term "component product", unless otherwise specified, is intended to refer to a single product that is part of a package.

The term "component product price", unless otherwise specified, is intended to refer to the price of a product that is sold as part of a package.

The term "individual product price", unless otherwise specified, is intended to refer to the price of a product that is not sold as part of a package.

The term "package", unless otherwise specified, is intended to refer to a group of at least two component products.

The term "package price", unless otherwise specified, is intended to refer to the price of a group of at least two component products.

The term "product family", unless otherwise specified, is intended to refer to a classification of goods or merchandise, such as beverages.

The term "product identifiers", unless otherwise specified, is intended to refer to an identifier corresponding to a product that may be used to determine information regarding that product.

The aforementioned and defined terms are used below to describe embodiments of the present invention. Where appropriate, like terms are referred to with like reference numerals.

The following paragraphs describe the structural and operational aspects of the present invention. The structural aspects are illustrated first and are followed by a description of the operational aspects.

In terms of structure, reference is now made to FIG. 1. Therein depicted is a block diagram representing a package offering system 100 for a retail establishment equipped to identify products that are complementary, identify a package including the complementary products and the availability thereof based on sales performance, and determine a package price. System 100 is further equipped to offer the complementary products at the package price. System 100 is still further equipped to adjust sales performance data for complementary products sold. System 100 includes a server 102 which is connected through a network 104 (e.g., a local area network (LAN)) to a plurality of point-of-sale (POS) terminals (i. e. , POS TERMINAL 106, POS TERMINAL 108 and POS TERMINAL 110). System 100 may include any number of POS terminals. Further, network 104 may include wireless connections, radio based communications, telephony based communications, and other network-based communications such as wide area networks distributed via open architectures such as by the Internet.

Figure 2:
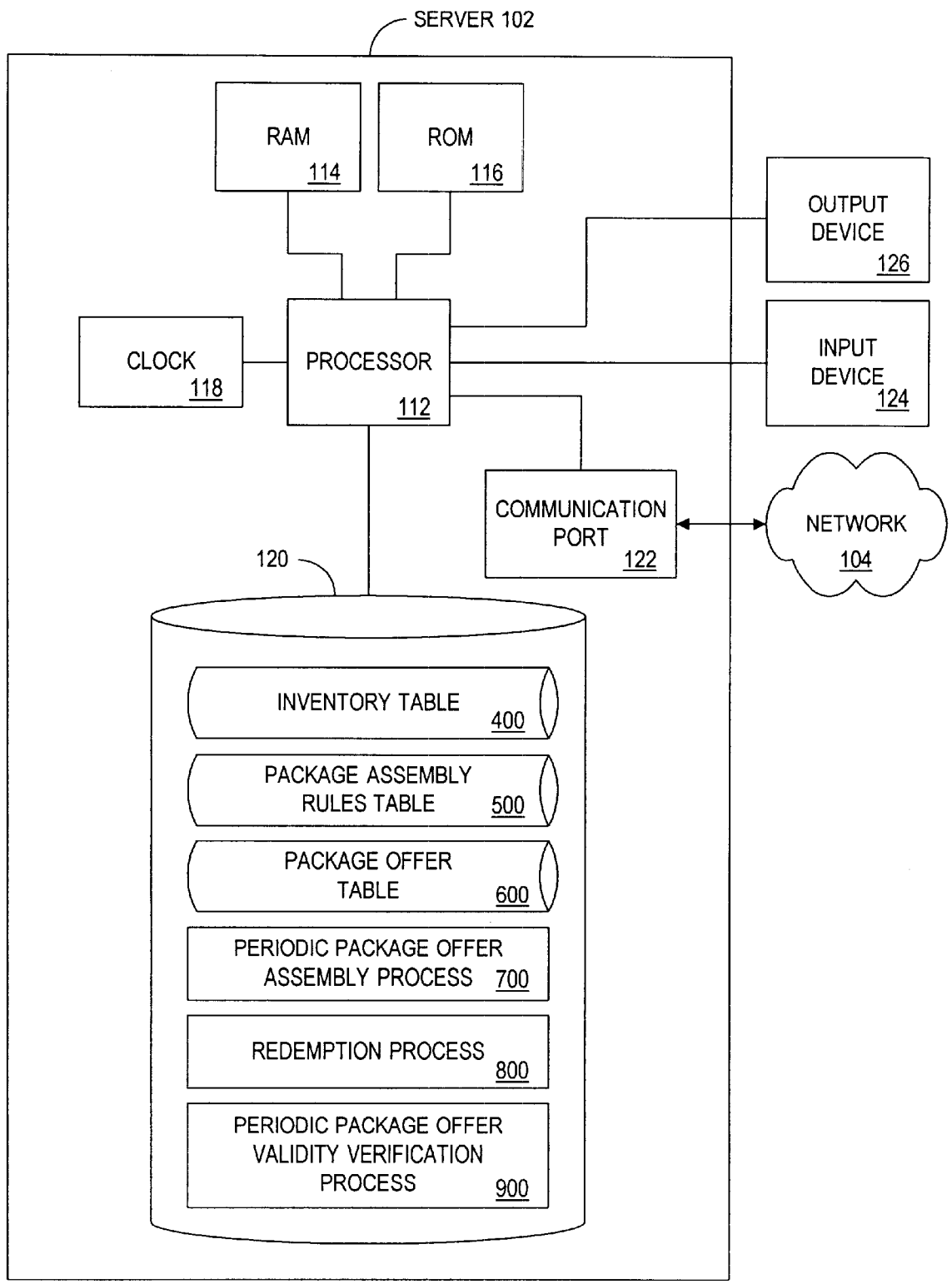
FIG. 2 is a block diagram of the server in FIG. 1.

Referring now to FIG. 2, server 102 is a data processing system including a processor 112, a random access memory unit (RAM) 114, a read-only memory unit (ROM) 116, an internal clock 118, a data storage device 120, and a communication port 122 for communicating via network 104 with POS terminals. An input device 124 (e.g., a keyboard) and an output device 126 (e.g., a display, a computer monitor, LCD (liquid crystal display) price tags, kiosks, shopping cart monitors, hand held PDAs ("Personal Data Assistants"), electronic billboards/screens or receipt/coupon printers) interface with processor 112.

Data storage device 120 is an appropriate combination of magnetic, semiconductor and/or optical memory. It will be appreciated that data storage device 120 may be one that consists of multiple disk sub-systems which may be geographically dispersed and in communication via a network architecture. The implementation of local and wide-area database management systems to achieve the functionality of data storage device 120 will be understood by those skilled in the art.

Data storage device 120 stores an INVENTORY TABLE DATABASE 400, a PACKAGE ASSEMBLY RULES TABLE DATABASE 500, a PACKAGE OFFER TABLE DATABASE 600, a PERIODIC PACKAGE OFFER ASSEMBLY PROCESS PROGRAM 700, a REDEMPTION PROCESS PROGRAM 800, and a PERIODIC PACKAGE OFFER VALIDITY VERIFICATION PROCESS PROGRAM 900. INVENTORY TABLE DATABASE 400 maintains inventory related data (including demand rate) for each product. PACKAGE ASSEMBLY RULES TABLE DATABASE 500 maintains a set of rules for determining products to be combined to compose a package. PACKAGE OFFER TABLE DATABASE 600 maintains offer criteria for each package. PERIODIC PACKAGE OFFER ASSEMBLY PROCESS PROGRAM 700 retrieves inventory data from INVENTORY TABLE DATABASE 400, compatible product data for a package from PACKAGE ASSEMBLY RULES TABLE DATABASE 500 and package offer criteria from PACKAGE OFFER TABLE DATABASE 600 to provide an offer of the package. REDEMPTION PROCESS PROGRAM 800 retrieves inventory data from INVENTORY TABLE DATABASE 400, compatible product data for a package from PACKAGE ASSEMBLY RULES TABLE DATABASE 500 and package offer criteria from PACKAGE OFFER TABLE DATABASE 600 to provide for redemption of a package and to test package offer validity. PERIODIC PACKAGE OFFER VALIDITY VERIFICATION PROCESS PROGRAM 900 retrieves inventory data from INVENTORY TABLE DATABASE 400, compatible product data for a package from PACKAGE ASSEMBLY RULES TABLE DATABASE 500 and package offer criteria from PACKAGE OFFER TABLE DATABASE 600 to provide an offer of the package offer if valid as determined by a pre-defined time period.

Figure 3:
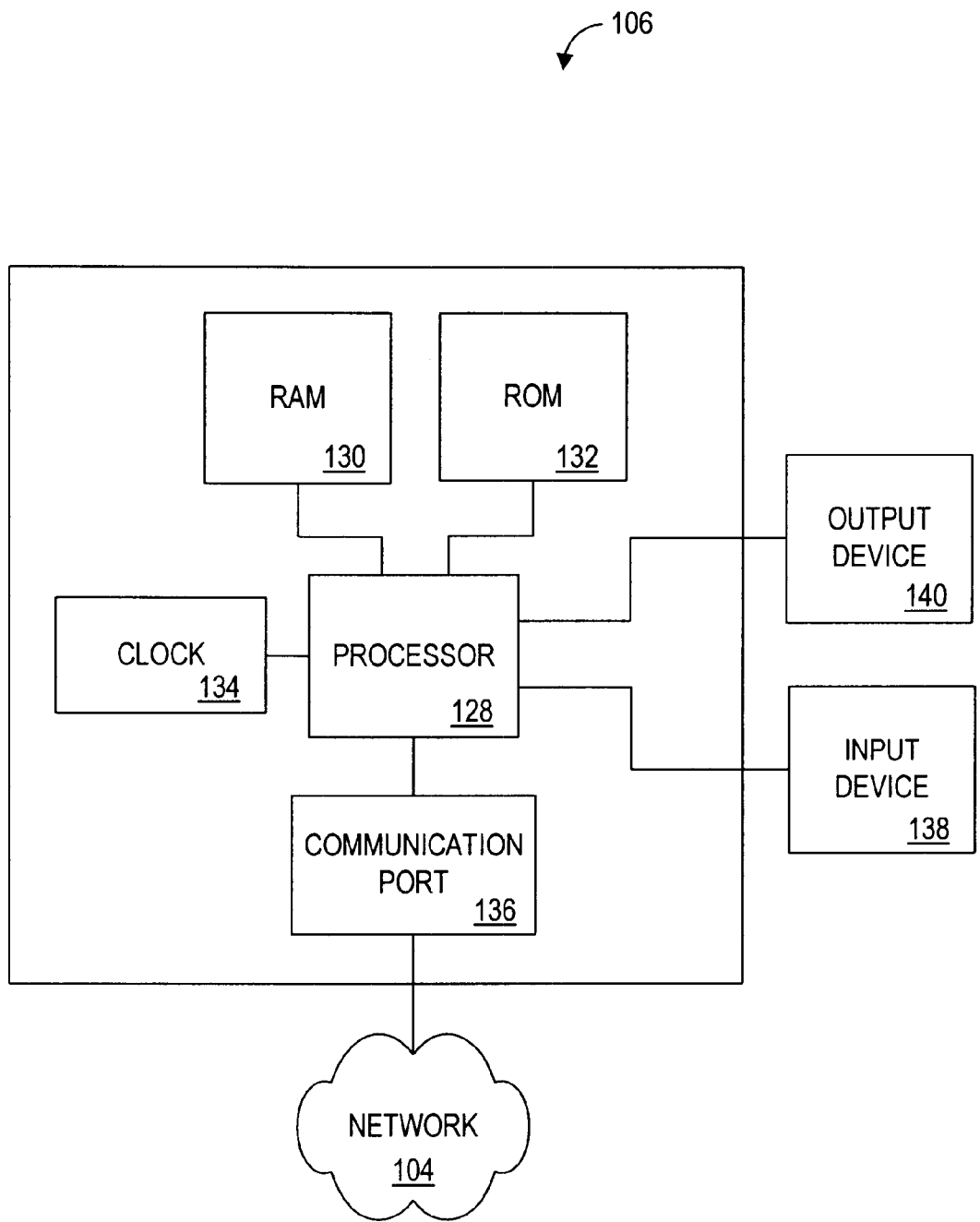
FIG. 3 is a block diagram of a point-of-sale (POS) terminal in FIG. I.

Referring now to FIG. 3, the POS terminal 106 is shown. POS terminal 106 is a data processing system which includes a processor 128, a random access memory unit (RAM) 130, a read-only memory unit (ROM) 132, an internal clock 134, and a communication port 136 for communicating via network 104 with server 102. An input device 138 (e.g., a keyboard or a scanner) and an output device 140 (e.g., a display, a computer monitor, LCD (liquid crystal display) price tags, kiosks, shopping cart monitors, hand held PDAs, electronic billboards/screens or receipt/coupon printers) interface with processor 128. Input device 138 generates signals that identify the product being purchased as entered at a keyboard or as scanned by a scanning devices, such as a UPC (Universal Product Code) bar code reader. POS terminal 106 is adapted to receive data signals from the input device and process the information in combination with data received from server 102 via network 104.

Processor 128 generates data representative of the products being purchased or offered, and transmits the data via network 104 to server 102. The server 102 determines package availability and compliance, and if appropriate, determines the package price of the entered item. The package price is then transmitted via network 104 from server 102 to POS terminal 106 where it is displayed, printed and/or utilized in processing a sale. Once a package price is established, the sale of complementary products in the package is processed in a known manner. For example, POS terminal 106 may print a customer sales receipt of the transaction. The receipt may include the name of the products purchased, the package price, the time/date, the subtotal of purchase, any applicable taxes, and the total price of the purchase.

The INVENTORY TABLE DATABASE 400 is used in the present invention to manage data including product unit price, available inventory and demand rate for product identifiers. The PACKAGE ASSEMBLY RULES TABLE DATABASE 500 is used in the present invention to manage data regarding rules defining a package, and the PACKAGE OFFER TABLE DATABASE 600 is used in the present invention to manage data regarding package offer criteria. Each of the tables has a column and row arrangement whereby columns define fields and rows define records stored according to the field specification of the columns. Of course, many changes and alterations may be made to such tables to effectuate various functions depending on particular design and implementation details. Such changes and alterations will be apparent to those skilled in the art.

FIG. 4 illustrates an example of INVENTORY TABLE DATABASE 400 which stores records relating to inventory of products. In TABLE DATABASE 400 there are four columns which store data related to PRODUCT ID 402, PRODUCT UNIT PRICE 404, AVAILABLE INVENTORY 406 and DEMAND RATE 408. In TABLE DATABASE 400 the first record contains information related to inventory data for an exemplary product having a PRODUCT ID (product identifier) of "PRODUCTFAM_A_UNIQUEPRODID_7". The inventory data for this first record includes a PRODUCT UNIT PRICE of "$1.00", an AVAILABLE INVENTORY of "15" and a DEMAND RATE of "20/DAY". The other records include inventory data for the other exemplary products identified.

FIG. 5 illustrates an example of PACKAGE ASSEMBLY RULES TABLE DATABASE 500 which stores records relating to a set of rules for defining a package. In TABLE DATABASE 500 there are six columns, which store data related to PACKAGE OFFER RULE ID 502, NUMBER OF COMPONENT PRODUCTS IN PACKAGE OFFER 504, PACKAGE OFFER PRICE FACTOR 506, COMPLEMENTARY PRODUCT FAMILIES 508, COMPLEMENTARY DEMAND RATE RULES 510 and PACKAGE OFFER REDEMPTION RULE(S) 512. In TABLE DATABASE 500 the first record contains information related to rules for a package having a PACKAGE OFFER RULE ID of "R1". The rules for this package include a NUMBER OF COMPONENT PRODUCTS IN PACKAGE OFFER of "2", a PACKAGE OFFER PRICE FACTOR of "−10% (PRODUCT ID 1+PRODUCT ID 2)" indicating a 10% discount off the combined component prices, a COMPLEMENTARY PRODUCT FAMILIES of "PRODFAM_A, PRODFAM_B; PRODFAM_A, PRODFAM_C; PRODFAM_B, PRODFAM_C" identifying groupings of complementary products for this package offer, a COMPLEMENTARY DEMAND RATE RULES of ">15/DAY and <5/DAY" indicating the demand rate range within which the package offer can be assembled, and a PACKAGE OFFER REDEMPTION RULE(S) of "WHILE SUPPLIES LAST" indicating other conditions that limit the package offer assembly. The other record includes rules for the other exemplary package offer identified.

FIG. 6 illustrates an example of PACKAGE OFFER TABLE DATABASE 600 which stores records relating to a package offer criteria. In TABLE DATABASE 600 there are six columns, which store data related to PACKAGE OFFER ID 602, PACKAGE OFFER RULE ID 604, PACKAGE OFFER PRICE 606, PACKAGE OFFER REDEMPTION RULES 608, COMPONENT PRODUCTS 610, AND PACKAGE OFFER STATUS 612. In TABLE DATABASE 600 the first record contains information related to criteria for offering a package having a PACKAGE OFFER ID of "P1". The criteria for offering this exemplary package include a PACKAGE OFFER RULE ID of R1, a PACKAGE OFFER PRICE of $2.70, a PACKAGE OFFER REDEMPTION RULE(S) of "WHILE SUPPLIES LAST", a COMPONENT PRODUCTS "PRODFAM_A_UNIQUEPRODID_7, PRODFAM_B_UNIQUEPRODID_9", and a PACKAGE OFFER STATUS of "VALID". The other record includes offer criteria for the other exemplary package offer identified.

The structure and arrangement of the tables described herein, including their columns and fields, may be altered to suit various design requirements. Many columns may be added to any one or all of the tables to carry out certain functionality control within a data processing system employing the table databases. Such additions and changes will be readily apparent to those skilled in the art.

The aforementioned descriptions were concerned with the structural aspects of an id embodiment and corresponding components of the present invention. Accordingly, it should be understood that server 102 and POS terminals 106, 108, 110 of package offering system 100 shown in FIGS. 1–3 and the database table databases 400, 500, 600 illustrated in FIGS. 4–6 have been designed to operate and function together. The flowcharts depicted in FIGS. 7 through 9 and described below illustrate how such structures operate together. In particular, described below are the steps carried out by package offering system 100 within a retail establishment to offer and sell complementary products in a package to customers.

Figure 7A:
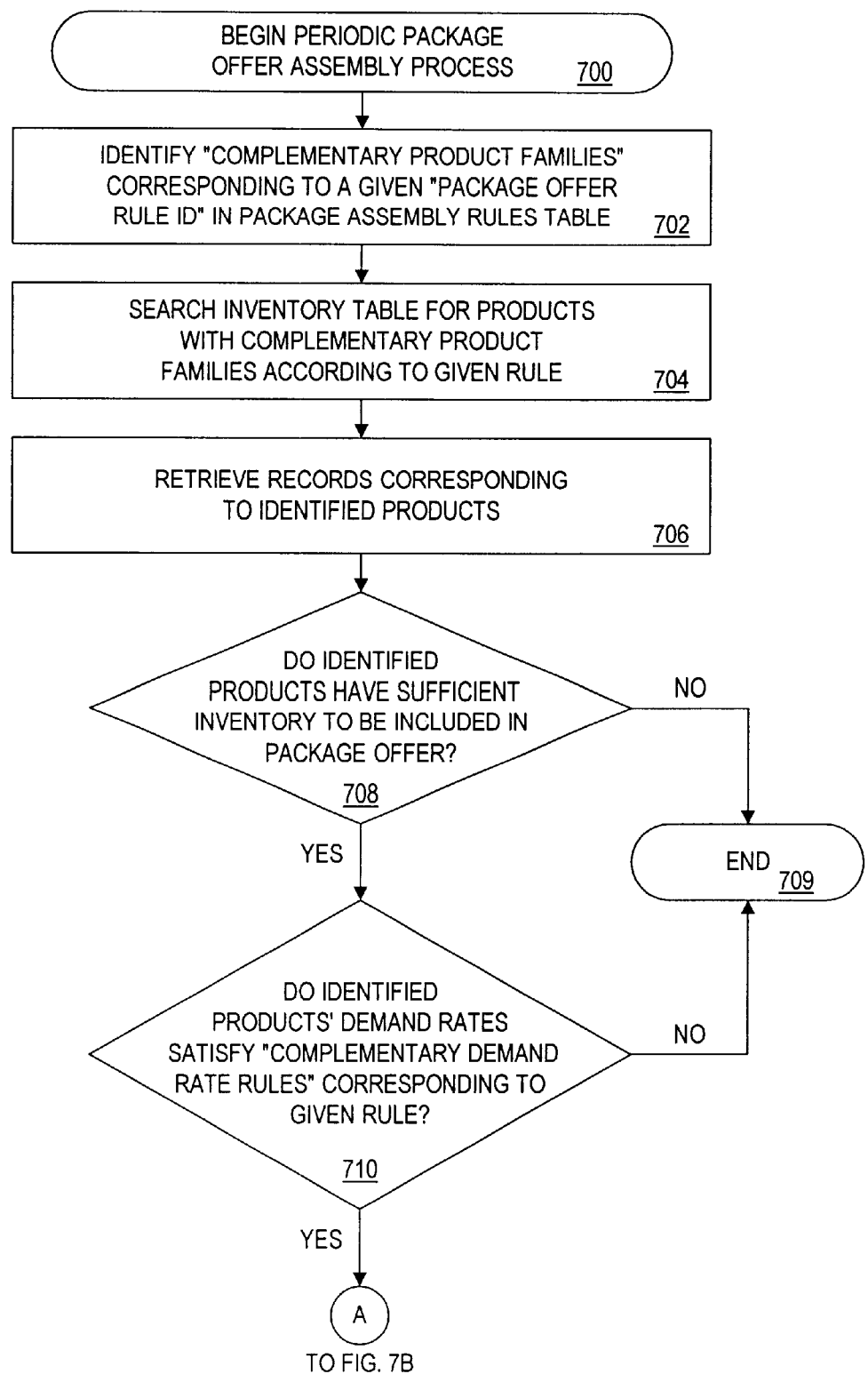
FIGS. 7A–C are a flowchart illustrating the operation of the PERIODIC PACKAGE OFFER ASSEMBLY PROCESS PROGRAM of FIG. 2.
Figure 7B:
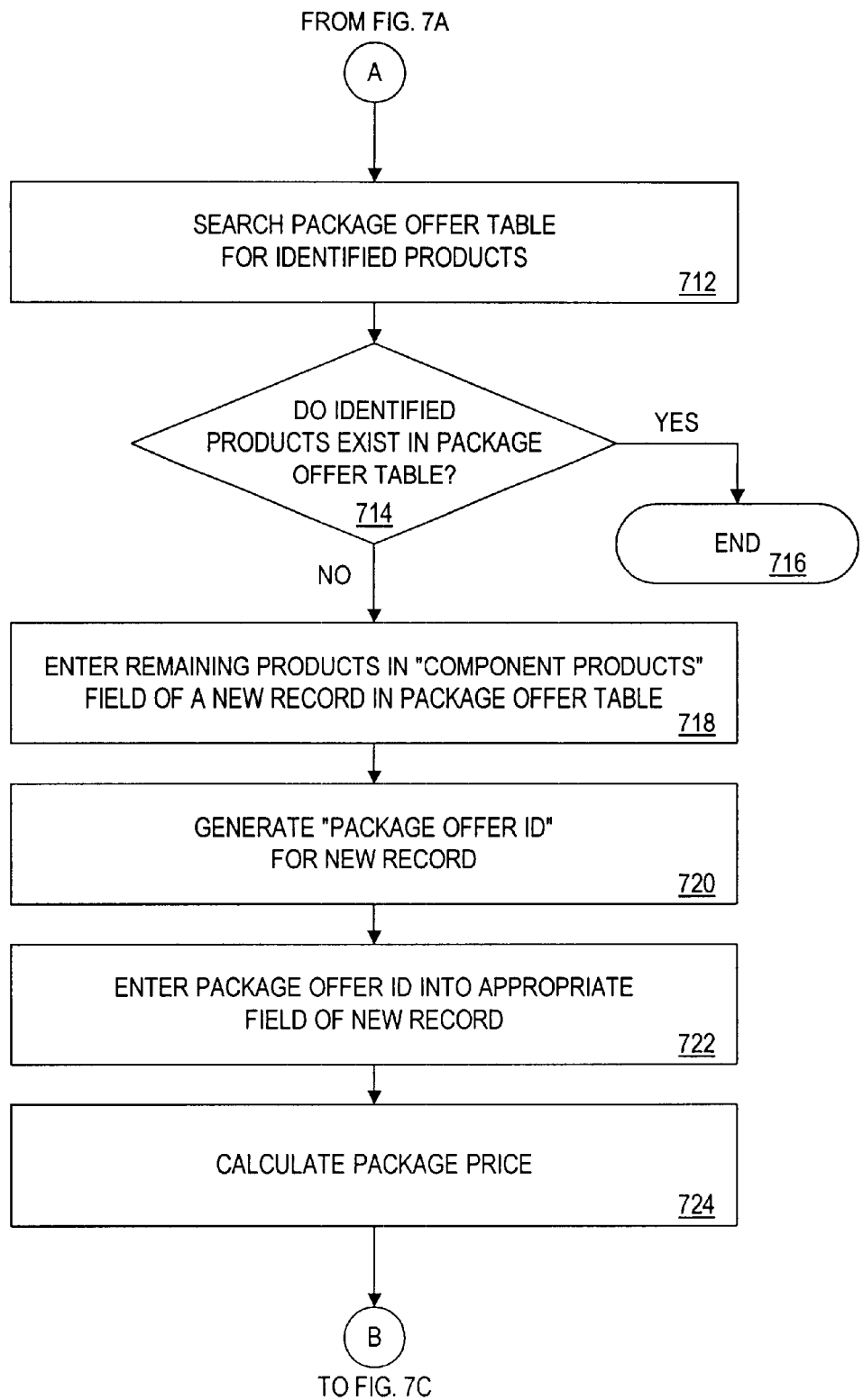
Figure 7C:
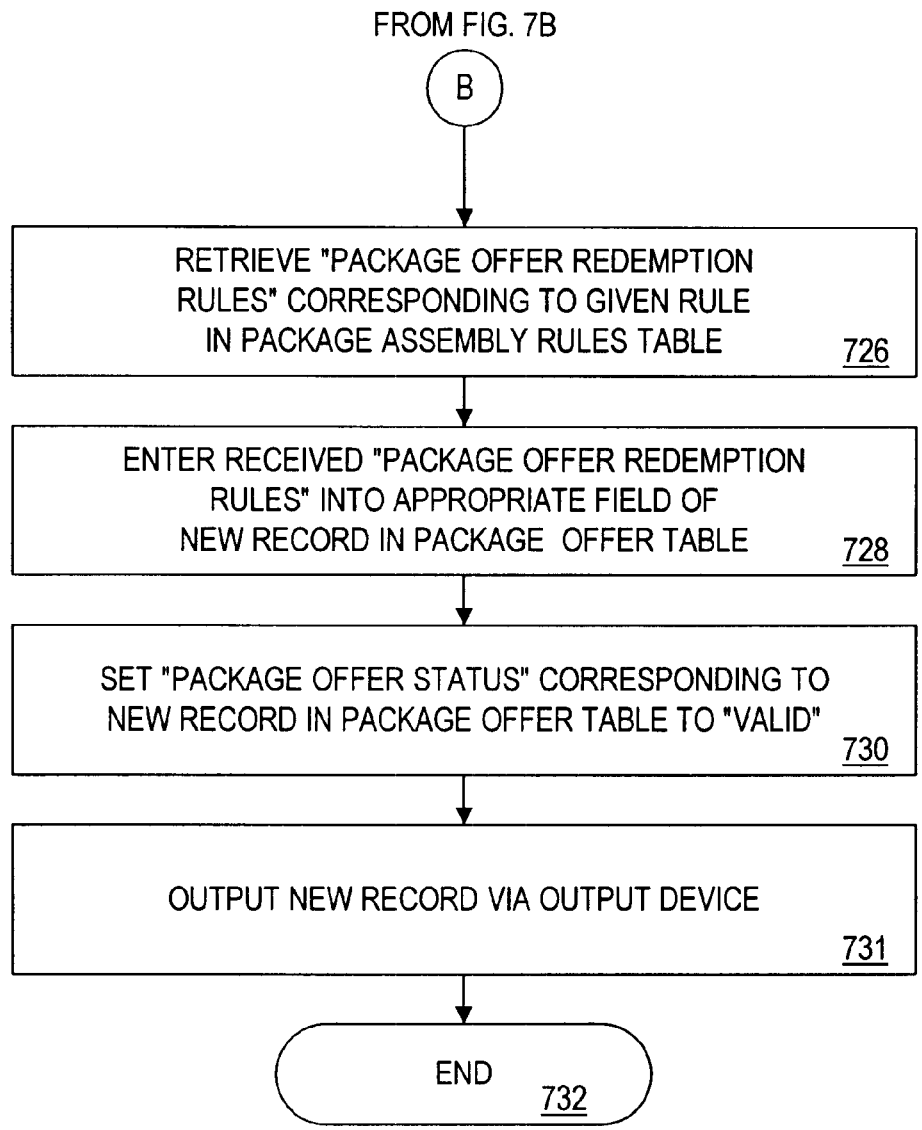

Reference is now made to FIGS. 7A–C. Depicted therein is a flowchart that illustrates the steps of a process performed by a data processing system, such as package offering system 100, in accordance with PERIODIC PACKAGE OFFER ASSEMBLY PROCESS PROGRAM 700.

Although PERIODIC PACKAGE OFFER ASSEMBLY PROCESS PROGRAM 700 functions to assemble a single package offer, it can be repeated for every package offer rule.

At Step 702, a COMPLEMENTARY PRODUCT FAMILY which corresponds to a given record of PACKAGE OFFER RULE ID 502 in DATABASE 500 is identified. The determination of which product families are complementary is given in the database and is based on the sales performance data. Having identified a COMPLEMENTARY PRODUCT FAMILY, the next Step 704 is to search DATABASE 400 for records corresponding to the complementary products defined by the identified COMPLEMENTARY PRODUCT FAMILY. Then at Step 706 corresponding records are retrieved from DATABASE 400, and at step 708 an inquiry is made to determine if there is sufficient inventory of each complementary product. Inventory levels are indicated by the corresponding AVAILABLE INVENTORY 406 in DATABASE 400 for each record. If available inventory for any of these complementary products is not sufficient, then this process is ended at Step 709. If available inventory for each of the complementary products is sufficient then the process continues to Step 710. At step 710 an inquiry is made to determine if the DEMAND RATE for each of the found records satisfies COMPLEMENTARY DEMAND RATE RULES recited for the corresponding record in DATABASE 500. If the demand rate for any of these complementary products does not satisfy the rule then this process is ended at Step 709, and if the demand rate for each of the complementary products does satisfy the rule then the process continues at Step 712. At Step 712 DATABASE 600 is searched to determine component products corresponding to the complementary products. At Step 714 an inquiry is made to determine if these complementary products are found in the search of DATABASE 600. This Step 714 ensures that products already being offered in one package will not be offered in another package. In an alternate embodiment, a product can be offered simultaneously in several packages. If these complementary products are found as a defined package in DATABASE 600 then this process is ended at Step 716. If these complementary products are not found as an assembled package in DATABASE 600 then the process continues at Step 718. At Step 718 these complementary products are entered as component products in DATABASE 600 as a new record. Then at Step 720 a PACKAGE OFFER ID is generated for the new record. At Step 722 this new PACKAGE OFFER ID is entered in the PACKAGE OFFER ID field 602 in DATABASE 600 corresponding to this new record. At Step 724 a price is calculated for this package (new record) and entered as a package offer price in DATABASE 600 for this new record. At Step 726 a package offer redemption rule is retrieved from DATABASE 500 for a corresponding given rule. Then at Step 728 the retrieved package offer redemption rule is entered as a package offer redemption rule in DATABASE 600 for the new record. At Step 730 a package offer status for this new record is set to "VALID". This new package offer (record) is then output via output device 126 or output device 140 at step 731. The process then ends at Step 732.

Figure 8A:
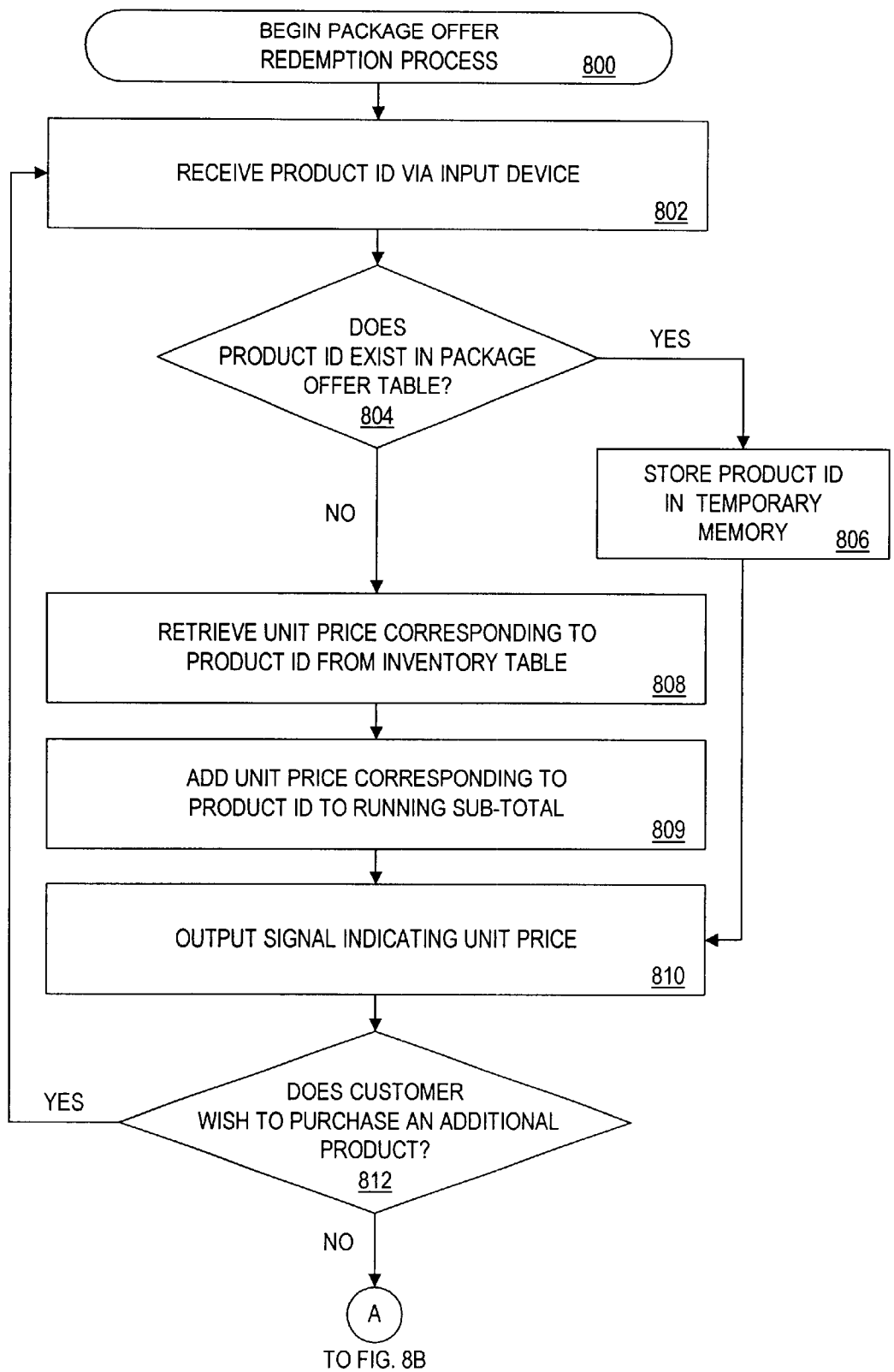
FIGS. 8A–C are a flow chart illustrating the operation of the PACKAGE OFFER REDEMPTION PROCESS PROGRAM of FIG. 2.
Figure 8B:
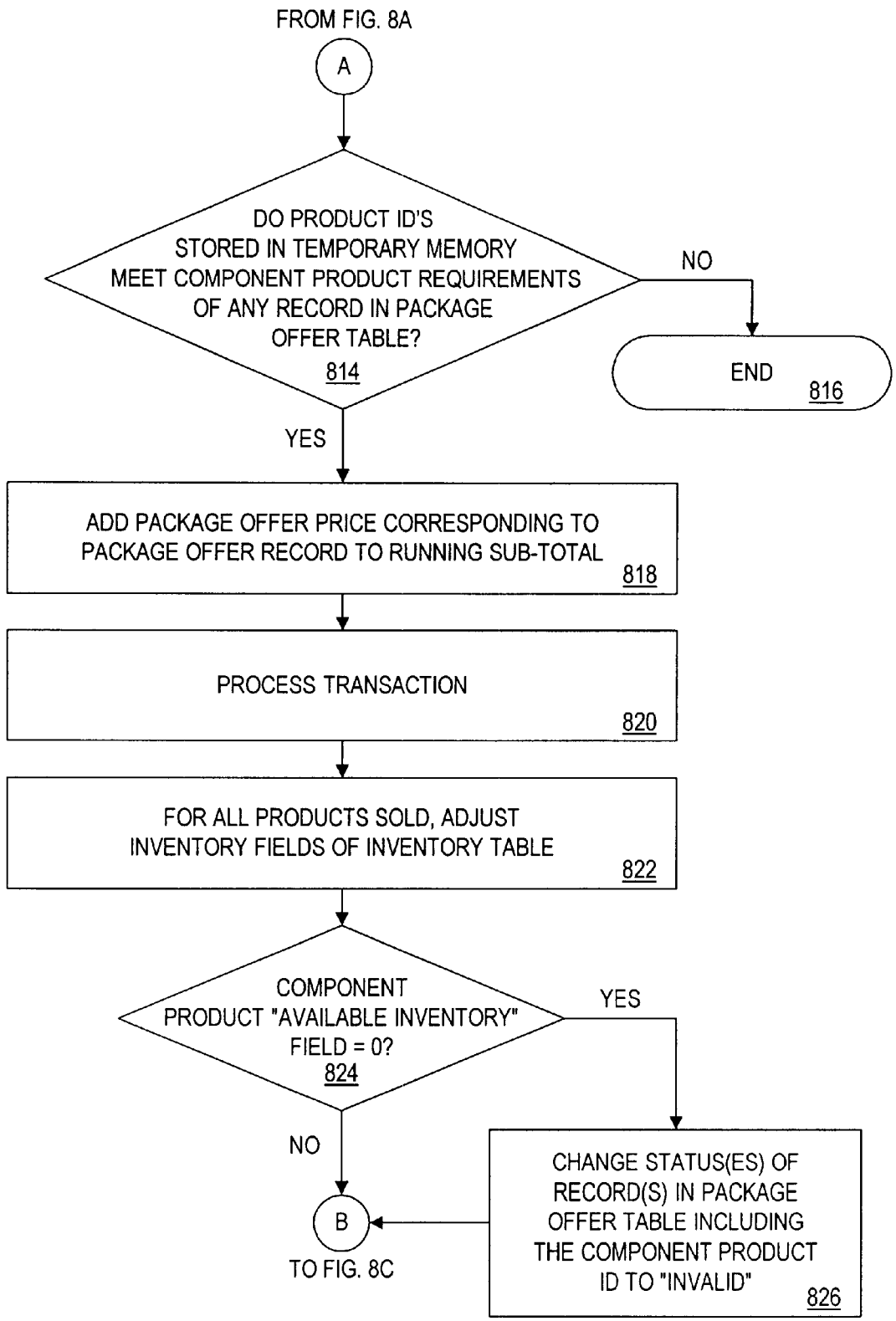
Figure 8C:
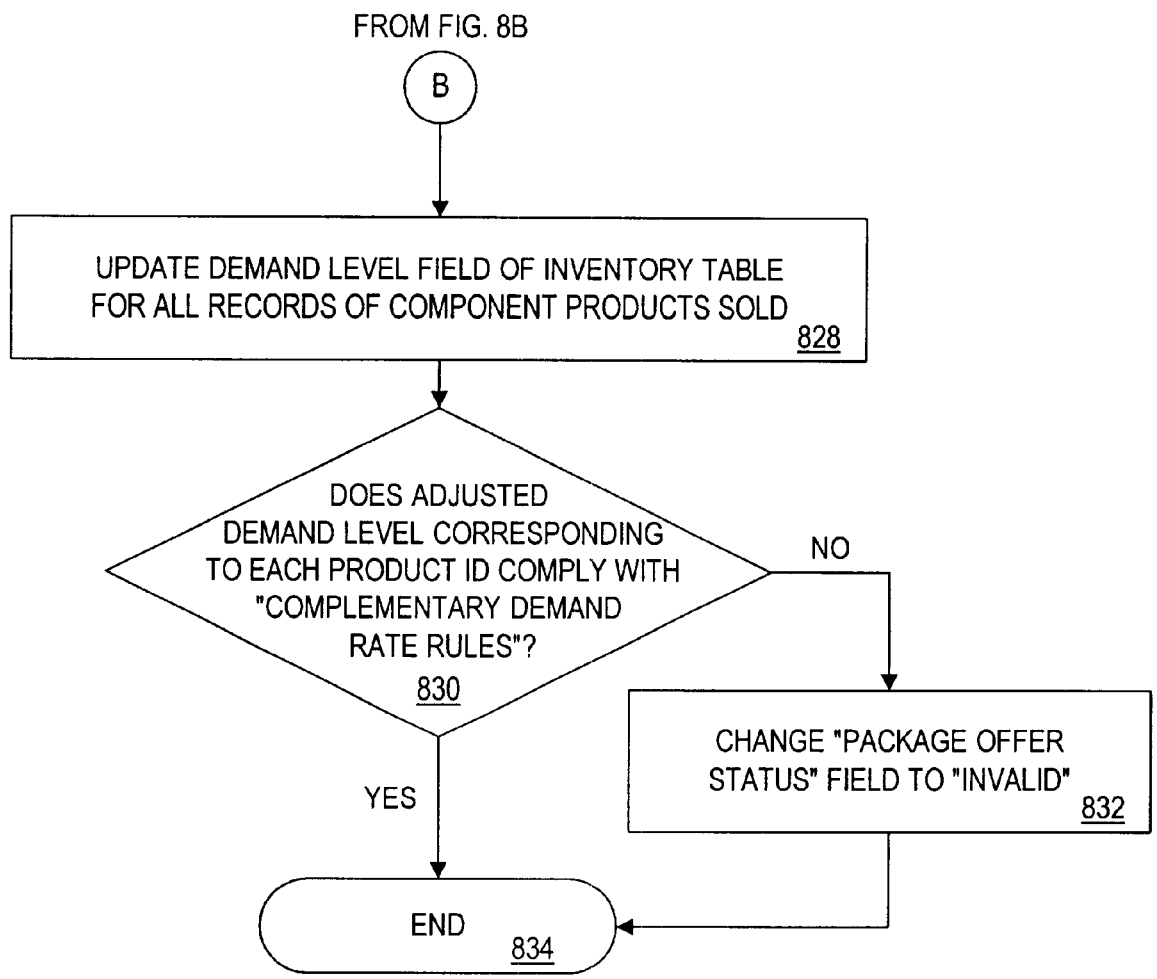

FIGS. 8A–C are a flowchart illustrating the steps of a process performed by a data processing system, such as package offering system 100, as directed by REDEMPTION PROCESS PROGRAM 800. At checkout, REDEMPTION PROCESS PROGRAM 800 enables consumers to take advantage of package offers and to purchase products conventionally by adding package offer prices to the transaction total after all products in the transaction have been entered in the POS terminal. This way, the system waits for all the items in a transaction to "run through" (be entered into the POS terminal) before a package price is applied. Alternatively, the package price can be added to the running sub-total during the transaction (while being "run through") as soon as it is determined that the necessary component products exist to qualify for the package offer price. Additionally, this process also tests the validity of package offers after redemption.

Once REDEMPTION PROCESS PROGRAM 800 is selected processing starts at Step 802 where input device 138 of one of a POS terminal obtains a product identifier for a product.

The identifier is then communicated via network 104 to server 102. At Step 804 DATABASE 600 is searched for a component product corresponding to this product identifier. If this product identifier is found in the records of DATABASE 600 then it is stored in a temporary memory location at Step 806 and processing continues at Step 810, described below. If this product identifier is not found in the records of DATABASE 600 then the process continues to Step 808. At Step 808 a product unit price corresponding to the product identifier, is retrieved from Inventory Table DATABASE 400. At Step 809, the corresponding product unit price is then transmitted to the POS terminal via network 104 and is added to a running sub-total of a customer's purchases. The PRODUCT UNIT PRICE is then output via output device 140 of the POS terminal at Step 810 where it is displayed or alternatively, a "price to be determined" message is displayed. At Step 812 an inquiry is made to determine if the customer wishes to purchase an additional product. If the customer wishes to purchase an additional product, processing returns to Step 802 for that additional product. If the customer does not wish to purchase an additional product then the process continues at Step 814, where an inquiry is made to determine if a plurality of product identifiers stored in the temporary memory location (Step 806) meet the requirements for a package as set forth in the COMPONENT PRODUCTS 610 in DATABASE 600. If the requirements of a package are not met then this process is ended at Step 816, and if the requirements of a package are met then the process continues to Step 818. At Step 818 the package offer price is added to the running sub-total of the customer's purchases at the POS terminal. Specifically, a package offer price corresponding to this package is retrieved from DATABASE 600. This retrieved package offer price is then communicated via network 104 to the POS terminal where the package price is added to the customer's running sub-total.

In one embodiment, because a single product cannot be offered in more than one package simultaneously, there will be no question of which package offer should be honored. However, in another embodiment referenced above, a single product can be offered in more than one package simultaneously. In this case, if a single product meets the component product requirements of more than one record of PACKAGE OFFER TABLE DATABASE 600, the following outcomes are possible:

(a) Package offers can be assigned priorities, so that if one PRODUCT ID is listed simultaneously in multiple package offers, one package offer will override another. Priorities can be based on inventory, demand, or degree of discount.

(b) The customer can be given the option of choosing which package offer they wish to accept. This way, the customer gets to pick the package deal with the highest perceived value.

(c) All package offers containing the common component PRODUCT ID can be honored, where the customer is charged the total of all package prices less a weighting factor to account for the common package component.

At Step 820 the purchase process for that customer is transacted in accordance with ordinary and customary procedures. At Step 822, appropriate available inventory in DATABASE 400 are adjusted for each product sold in the present transaction. At Step 824, an inquiry is made to determine if the available inventory for any of the products sold (as indicated by the appropriate record in PRODUCT ID 402) is below a desired level. In the present example, the desired level is given as zero. If the inventory level for any of the products sold is below the desired level, then processing continues at Step 826, and if the inventory level for each of the products in the package is above the desired level, processing continues at Step 828. At Step 826 the appropriate package offer status in DATABASE 600 is set to 'INVALID' for that corresponding record associated with PACKAGE OFFER ID 602. At Step 828 the appropriate demand rate in DATABASE 400 is updated for each product sold. At Step 830 an inquiry is made to determine if the demand rate in DATABASE 400 for each product in the package complies with the corresponding complementary demand rate rules in DATABASE 500. If the demand rates for the products do not comply with the complementary demand rate rules for the package then processing continues at Step 832, and if the demand rates for the products do comply with the complementary demand rate rules for the package then the process is ended at Step 834. At Step 832 the appropriate record of package offer status in DATABASE 600 corresponding to the package (as indicated by the records of PACKAGE OFFER ID 602) is set to 'INVALID', then the process proceeds to Step 834 where it is ended.

Figure 9A:
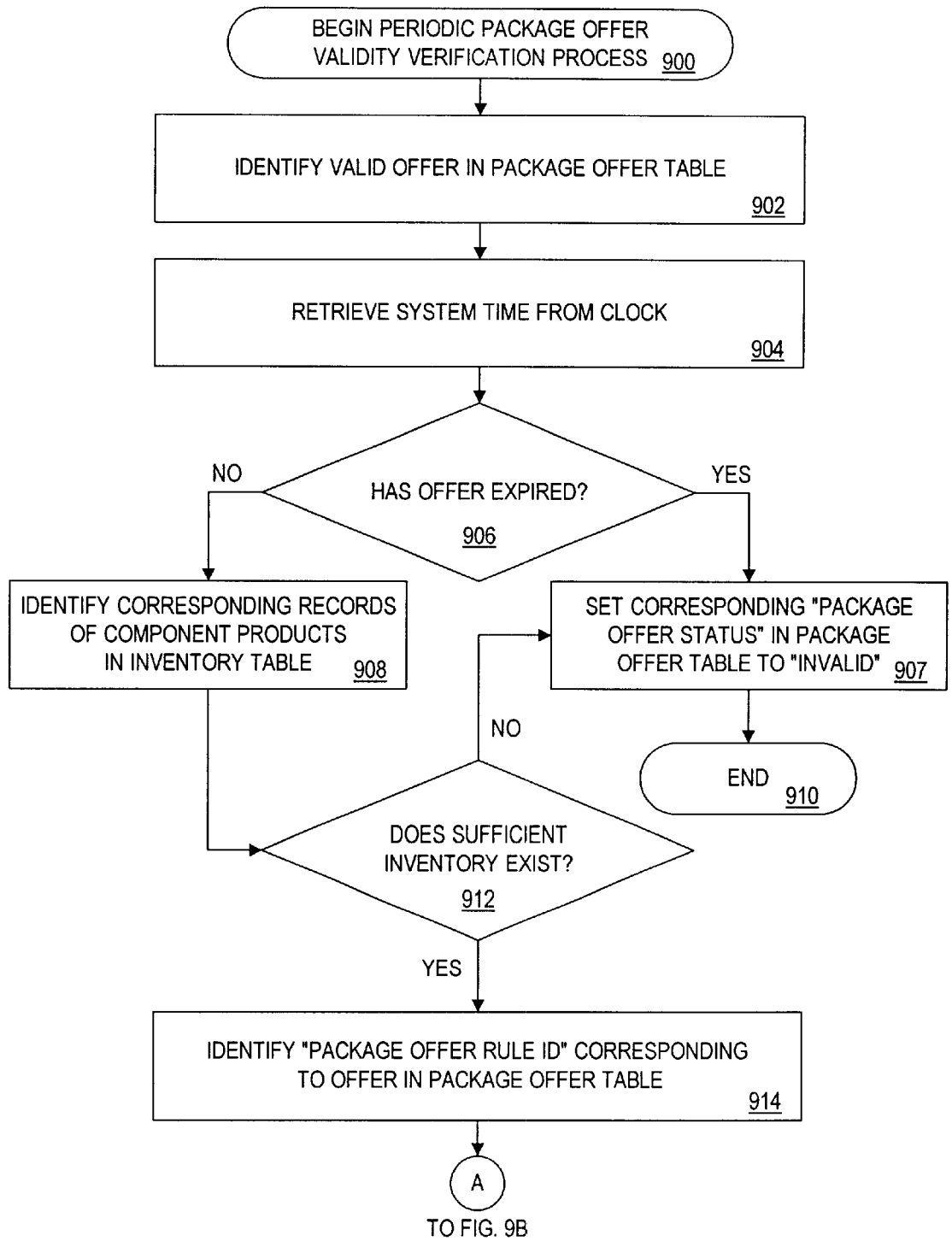
FIGS. 9A–B are a flow chart illustrating the operation of the PERIODIC PACKAGE OFFER VALIDITY VERIFICATION PROCESS PROGRAM of FIG. 2.
Figure 9B:
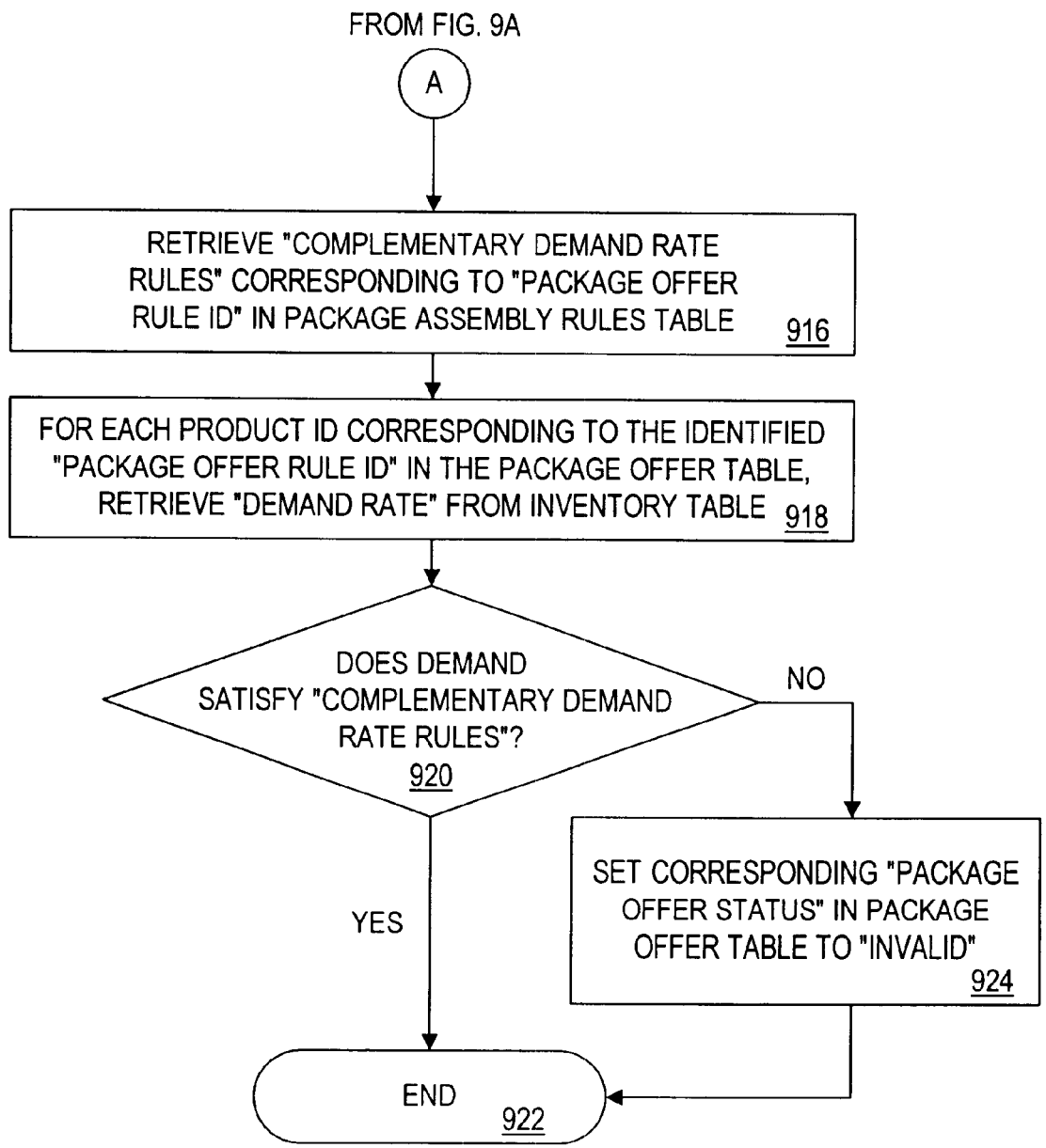

FIGS. 9A–B are a flowchart illustrating the steps of a process performed by a data processing system, such as package offering system 100, as directed by VALIDITY VERIFICATION PROCESS PROGRAM 900.

PERIODIC PACKAGE OFFER VALIDITY VERIFICATION PROCESS PROGRAM 900 can be executed for a single offer or repeated for each record in the PACKAGE OFFER TABLE DATABASE so that all offers are updated in a batch process.

Processing starts at Step 902 where each record 602 having a package offer status of 'VALID' in PACKAGE OFFER TABLE DATABASE 600 is identified. At Step 904 time is retrieved from clock 118 of server 102. At Step 906, an inquiry is made to determine if the time for offering the identified package has expired. If the time for offering a package has expired then processing continues at Step 907. If the time for offering a package has not expired then processing continues at Step 908. At Step 907, the appropriate PACKAGE OFFER STATUS in DATABASE 600 is set to 'INVALID', and the process is then ended at Step 910. At Step 908, the records in DATABASE 400 corresponding to the products listed in the component products field in DATABASE 600 are identified. At Step 912 an inquiry is made to determine if sufficient inventory exist, as provided by the appropriate available inventory fields in DATABASE 400, for each of the identified records of PRODUCT ID 402. If sufficient inventory does not exist for any one of the identified records of PRODUCT ID 402, then processing continues at Step 907. If sufficient inventory does exist, then processing continues at Step 914. At Step 914, a record of DATABASE 600 corresponding to the identified record of PACKAGE OFFER ID 602 is identified. At Step 916 a record corresponding to the PACKAGE OFFER RULE ID 502 of the identified record is retrieved. At Step 918 the record of DEMAND RATE 408 in DATABASE 400 corresponding to each product defined by component products in DATABASE 600 is retrieved for the identified record. At Step 920, an inquiry is made to determine if the demand rate for each product defined by the component products for the identified record satisfies the complementary demand rate rules in DATABASE 500. If the demand rate for each of the identified complementary products satisfies the rule then this process is ended at Step 922. If the demand rate for any of the identified complementary products does not satisfy the rule then the processing continues at Step 924. At Step 924 the appropriate PACKAGE OFFER STATUS in DATABASE 600 corresponding to the package is set to "INVALID". The process then proceeds to Step 922 where it is ended.

While demand rate and inventory availability (levels) are utilized by the exemplary rules herein for determining a package and related package criteria, it is within the spirit and scope of the present invention that other sales performance data may be utilized. By way of example, but not limited thereto, such other sales performance data includes product profitability, product turnover, product cost or any combination thereof (including combination with demand rate and inventory levels), as utilization of such will be readily apparent to one of ordinary skill in the art.

Accordingly, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A storage medium encoded with machine-readable computer program code, said computer program code for directing a computer to perform the steps of:

identifying product identifiers of products that are complementary;

verifying acceptable sales performance for the complementary products;

identifying a package including the product identifiers of the complementary products having acceptable sales performance, in which at least one of the complementary products having acceptable sales performance is associated with a demand rate that is greater than a predetermined demand rate;

determining a package price for the products identified by the product identifiers included in the package; and outputting the package via an output device.

2. The method of claim 1, in which at least one of the complementary products having acceptable sales performance is associated with a second demand rate that is less than a second predetermined demand rate.

3. A method of offering a plurality of products, the method comprising the steps of:

identifying product identifiers of products that are complementary;

verifying acceptable sales performance for the complementary products;

identifying a package including the product identifiers of the complementary products having acceptable sales performance, in which at least one of the complementary products having acceptable sales performance is associated with a demand rate that is greater than a predetermined demand rate;

determining a package price for the products identified by the product identifiers included in the package; and outputting the package via an output device.

4. The method of claim 3, wherein the output device is one of a computer monitor, a display and a kiosk.

5. The method of claim 3, further comprising the steps of:

identifying a second package including at least one of the product identifiers of the complementary products; and selecting one of the packages.

6. The method of claim 5, wherein the selecting step is performed on the basis of a characteristic of the packages.

7. The method of claim 5, wherein the selecting step is performed on the basis of a choice made by a customer.

8. The method of claim 3, further comprising:

offering the products identified by the product identifiers included in the package at the package price.

9. The method of claim 8, wherein the step of offering comprises:

displaying information indicative of the package and the package price.

10. The method of claim 3, wherein the sales performance comprises:

inventory levels for the complementary products.

11. The method of claim 10, wherein the step of verifying comprises:

calculating the inventory levels for the complementary products.

12. The method of claim 3, wherein the sales performance comprises:

demand rates for the complementary products.

13. The method of claim 12, wherein the step of verifying comprises:

calculating the demand rates for the complementary products.

14. The method of claim 3, wherein the sales performance comprises:

profitability levels for the complementary products.

15. The method of claim 3, wherein the sales performance comprises:

turnover rates for the complementary products.

16. The method of claim 3, wherein the sales performance comprises:

cost for the complementary products.

17. The method of claim 3, wherein the step of identifying comprises:

identifying the package from a stored table.

18. The method of claim 3, wherein the step of determining comprises:

retrieving a stored package price.

19. The method of claim 3, wherein the step of determining comprises:

determining a product price for each product identified by the product identifiers included in the package; and calculating the package price based on the product prices.

20. The method of claim 3, further comprising:

verifying validity of the package.

21. The method of claim 20, wherein the step of verifying validity of the package comprises:

setting a status of the package to invalid when a time interval in which the package is available has expired.

22. The method of claim 3, in which at least one of the complementary products having acceptable sales performance is associated with a second demand rate that is less than a second predetermined demand rate.

23. A method for offering a plurality of products, the method comprising the steps of:

identifying product identifiers of products that are complementary;

verifying acceptable sales performance for the complementary products;

identifying a package including the product identifiers of the complementary products having acceptable sales, in which at least one of the complementary products having acceptable sales performance is associated with a demand rate that is greater than a predetermined demand rate;

determining a package price for the products identified by the product identifiers included in the package;

outputting the package via an output device; and storing the package in a data storage device.

24. The method of claim 23, in which at least one of the complementary products having acceptable sales performance is associated with a second demand rate that is less than a second predetermined demand rate.

25. A method for offering a plurality of products, the method comprising the steps of:

assembling a first package offer on the basis of inventory data in a database, in which the first package offer includes an indication of at least one product that is associated with a demand rate that is greater than a predetermined demand rate;

outputting the first package;

receiving sales transaction data;

adjusting inventory data in the database on the basis of the received sales transaction data;

evaluating validity of the first package offer on the basis of the adjusted inventory data;

assembling a second package offer on the basis of the adjusted inventory data; and outputting the second package offer.

26. The method of claim 25, in which the first package offer includes an indication of at least one product that is associated with a second demand rate that is less than a second predetermined demand rate.

* * * * *